United States Patent [19]
Dickinson

[11] 3,922,910
[45] Dec. 2, 1975

[54] MEANS FOR DETERMINING THE RELATIVE SPEEDS OF THE INPUT AND OUTPUT SHAFTS OF A GEARBOX

[75] Inventor: Harvey Frank Dickinson, Bramhall, England

[73] Assignee: Ferranti Limited, Hollinwood, England

[22] Filed: May 21, 1974

[21] Appl. No.: 471,903

Related U.S. Application Data

[63] Continuation-in-part of Ser. No. 312,730, Dec. 6, 1972, abandoned.

[30] Foreign Application Priority Data
Dec. 7, 1971 United Kingdom............... 56661/71

[52] U.S. Cl...................................... 73/118; 73/162
[51] Int. Cl.²......................................... G01M 13/02
[58] Field of Search ....... 73/118, 507, 162; 324/161

[56] References Cited
UNITED STATES PATENTS
| | | | |
|---|---|---|---|
| 3,792,460 | 2/1974 | Ratz............................. | 324/161 UX |
| 3,809,956 | 5/1974 | Burkel et al.................... | 324/161 X |

Primary Examiner—Jerry W. Myracle
Attorney, Agent, or Firm—Cameron, Kerkam, Sutton, Stowell & Stowell

[57] ABSTRACT

Means for determining the relative speeds of the input and output shafts of a gearbox has transducer means to produce signals representative of the rotational speeds of both the input and output shafts of the gearbox, comparator means comprising first and second counters, upon the selection of a gear magnitudes with a ratio in relation to each other representative of the desired gear ratio being set in the counters, the arrangement being such that the signals from the transducer means then cause the magnitudes in the counters to change and the comparator means provides an output representative of the proportion of any difference between the desired gear ratio and the ratio of the rotational speeds of the input and output shafts in relation to the desired gear ratio, and in particular to indicate whether or not the detected proportion is less than a predetermined maximum value for the proportion.

11 Claims, 1 Drawing Figure

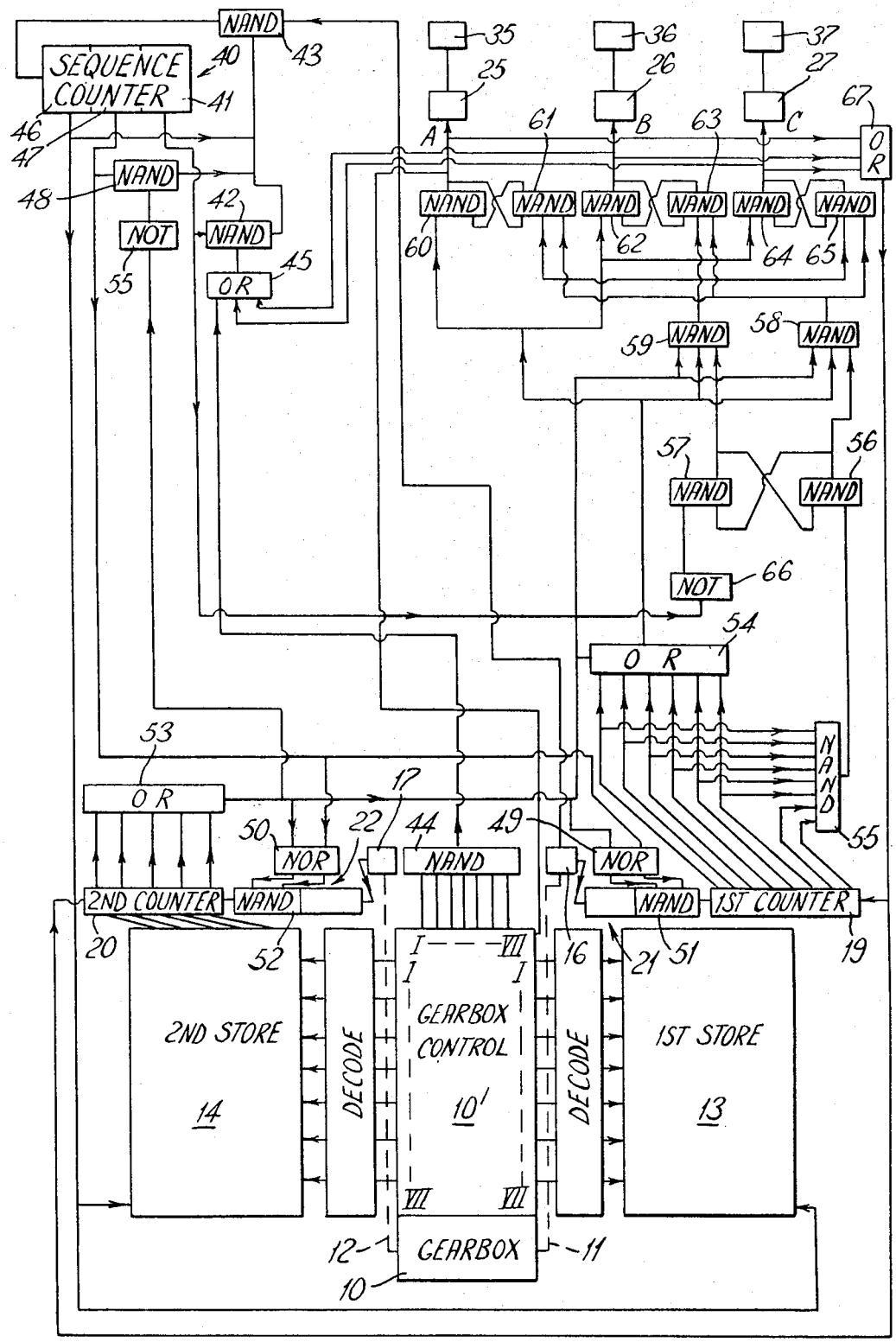

MEANS FOR DETERMINING THE RELATIVE SPEEDS OF THE INPUT AND OUTPUT SHAFTS OF A GEARBOX

This application is a continuation-in-part of copending application Ser. No. 312,730, filed Dec. 6, 1972, now abandoned.

This invention relates to means for determining the relative speeds of the input and output shafts of a gearbox.

When a selected gear is engaged the gearbox has a desired gear ratio, the optimum value for the ratio of the rotational speeds of the input and output shafts of the gearbox for the smooth engagement of the selected gear being that of the desired gear ratio. A gearbox which includes synchromesh mechanisms permits the satisfactory commencement of the smooth engagement of the selected gear when initially the ratio of the rotational speeds of the input and output shafts of the gearbox differs from the desired gear ratio. However, a gearbox, whether it includes synchromesh mechanisms or not, may be damaged if an attempt to commence the engagement of the selected gear is made when the proportion of the difference between the desired gear ratio and the ratio of the rotational speeds of the input and output shafts of the gearbox in relation to the desired gear ratio is greater than a value permitted by the design of the gearbox. Thus, the maximum value for the proportion inherently is predetermined when designing the gearbox.

It is an object of the present invention to provide means to provide an output representative of the proportion of any difference beteween the desired gear ratio and the ratio of the rotational speeds of the input and output shafts of the gearbox in relation to the desired gear ratio, and in particular, although not essentially, to indicate whether or not the proportion is less than the predetermined maximum value referred to above.

According to the present invention means for determining the relative speed of the input and output shafts of a gearbox comprises means having a first transducer and a second transducer arranged to produce signals representative of the rotational speeds of both the input shaft and the output shaft of the gearbox, comparator means including a first counter connected to the first transducer and a second counter connected to the second transducer, number generating means for setting magnitudes in the counters, the ratio of the magnitude set in the first counter to the magnitude set in the second counter being representative of the desired gear ratio for the gearbox, the magnitudes stored in the counters then being changed by signals from the transducer means, the arrangement being such that the comparator means provides an output representative of the proportion of any difference between the desired gear ratio and the ratio of the rotational speed of the input and output shafts of the gearbox in relation to the desired gear ratio.

The present invention will now be described by way of example with reference to the accompanying drawing, which shows diagrammatically in block form the constituent parts of one embodiment of means for determining the relative speeds of the input and output shafts of a gearbox according to the present invention.

The illustrated means for determining the relative speeds of the input and output shafts of a gearbox includes a gearbox 10 having seven gears, the engagement of the different gears providing for the gearbox seven different gear ratios between the input shaft, indicated by the chain-dotted line 11, and the output shaft indicated by the chain-dotted line 12. Each gear ratio is the optimum value for the ratio of the rotational speeds of the input and output shafts of the gearbox for the smooth engagement of the associated gear when selected, although the engagement of the gear possibly may be commenced satisfactorily when there is a difference between the gear ratio and the ratio of the rotational speeds of the shafts. Thus, for example, if the gear box includes synchromesh mechanisms, the engagement of the selected gear may be commenced satisfactorily if the proportion of the difference between the desired gear ratio and the ratio of the rotational speeds of the input and output shafts of the gearbox in relation to the desired gear ratio is less than a predetermined maximum value comprising an inherent design feature of the gearbox. The illustrated means according to the present invention is employed in combination with means not comprising part of the present invention to prevent the commencement of the engagement of a selected gear until the gear may be engaged smoothly, i.e. when the proportion is less than the predetermined maximum value.

Upon the selection of a gear, but before the commencement of the engagement of the gear, a gearbox control 10' produces a signal indicative of the selected gear, there being seven outputs from the gearbox control 10', different outputs I, II, III, IV, V, VI, and VII being associated with different gears. The outputs I . . . VII of the gearbox control are connected via decoding means to number generating means, which comprises two parts 13, and 14. Each number generating means 13 or 14 comprises store and, in response to signals from different outputs I . . . VII of the gearbox control 10' provides different digital signals. The ratio of the magnitudes represented by the digital signals from the first and second signal generating means 13 and 14, in response to the selection of any gear, is equal to the gear ratio associated with the gear.

Transducer means is provided, and by which means the rotational speeds of the input and output shafts 11 and 12 of the gearbox 10 are determined. The transducer means includes a first transducer and a second transducer comprising, respectively, a first tachometer 16 and a second tachometer 17. The transducers are arranged to produce pulses at frequencies in the same proportion to the rotational speeds, respectively, of the input and output shafts 11 and 12 of the gearbox.

Comparator means comprises a first counter 19 connected to the output of the first signal generating means 13, and a second counter 20 connected to the output of the second signal generating means 14. The first counter 19 is also connected, via an interface unit 21 to the first transducer 16; and the second counter is connected, via an interface unit 22 to the second transducer 17. The first counter 19 has eight outputs on which are obtained binary coded signals representative of the magnitude stored in the counter. At least the first counter 19 is reversible in operation, and the outputs of the first counter are connected to gating means described in detail below.

The gating means is connected to the means to prevent the commencement of the engagement of the selected gear until the gear may be engaged smoothly. Thus, the gating means is connected to three actuating mechanism 25, 26, and 27, each mechanism, for example, comprising an electrical relay. The first actuating mechanism 25 is connected to an output A of the gating means, and when energised in response to a signal therefrom causes the selected gear of the gearbox 10 to be engaged. The second actuating mechanism 26 is connected to an output B of the gating means and when energised causes the rotational speed of the input shaft of the gearbox to increase. The third actuating mechanism 27 is connected to an output C of the gating means and when energised causes the rotational speed of the input shaft of the gearbox to decrease.

In the operation of the means according to the present invention, upon the selection of a gear, the number generating means 13 and 14 supply digital signals, respectively, to the first and second counters 19 and 20, and magnitudes are set in the counters. These magnitudes have a ratio in relation to each other representative of the desired gear ratio. Pulses from the first and second transducers 16 and 17 are supplied, respectively, to the first and second counters to cause the magnitudes stored in the counters to be counted down.

Each pulse supplied to a counter from a transducer causes the magnitude stored therein to be reduced by one unit. Thus, the count-down rates, respectively, of the first and second counters. are representative of the rotational speeds of the input and output shafts of the gearbox. When the magnitude stored in either the first counter or the second counter reaches zero a signal is supplied to the other counter and the count-down of the magnitude stored in both the counters is stopped.

The magnitude stored in the first counter 19 when the count-down operation is stopped is represented by a binary coded signal on the eight outputs and is supplied to the gating means. The magnitudes initially stored in the counters 19 and 20 and the pulse frequencies of the transducers 16 and 17, are such that if the magnitude remaining in the reversible first counter is between zero and three, inclusively, the selected gear may be engaged smoothly. Thus, the means according to the present invention is arranged to conform to the design characteristics of the gearbox in this respect, and the different magnitudes required to be set initially in the counters 19 and 20 are derived empirically. The different magnitudes are written into preselected locations of the stores 13 and 14 comprising the number generating means, and the appropriate locations of the stores being addressed in response to a signal from the gearbox control 10'. Hence, the magnitude stored in the first counter 19 when the count-down operation is stopped is representative of the proportion of any difference between the desired gear ratio and the ratio of the rotational speeds of the input and output shafts of the gearbox in relation to the desired gear ratio. A final magnitude of three stored in the reversible first counter is representative of the proportion being less than the predetermined maximum value, and that the smooth engagement of the selected gear in accordance with the design characteristics of the gearbox is possible. In one particular example of a gearbox included in the means according to the present invention the predetermined maximum value for the proportion is ±5%.

The operation of the associated means to prevent the commencement of the engagement of the selected gear until the gear may be engaged smoothly is as follows. If the magnitude remaining in the first counter when the count-down operation is stopped is between zero and three, inclusively, the first actuating mechanism 25 is energised by a signal from the output A of the gating means. The first actuating mechanism 25 is connected to a latch 35 which prevents the engagement of any gear until it is disenabled by a signal from the first actuating mechanism upon the latter being energised.

However, if the magnitude remaining in the first counter when the count-down operation is stopped is greater than three but has not reached zero the second actuating mechanism 26 is energised from the output B of the gating means. The second actuating mechanism 26 is connected to an associated value 36. The valve is in the fuel injection system of an associated vehicle engine, and when the second actuating mechanism 26 is energised the value 36 is opened, causing more fuel to be supplied to the vehicle engine for any position of the accelerator than when the engine is operating normally. Thus, with the accelerator in a given position the opening of the valve 36 causes the rotational speed of the input shaft 11 of the gearbox to increase relative to the rotational speed of the output shaft 12. If the magnitude remaining in the reversible first counter is greater than three but has not reached zero the gear ratio is greater than the ratio of the rotational speeds of the input and output shafts of the gearbox. Hence, the proportion of the difference between these ratios in relation to the gear ratio is reduced to less than the predetermined maximum value by increasing the rotational speed of the input shaft 11 of the gearbox.

Alternatively, if the magnitude remaining in the reversible first counter when the count-down operation is stopped is greater than three and has passed through zero then the third actuating mechanism 27 is energised from the output C of the gating means. The third actuating mechanism 27 is connected to associated means 37 and is arranged, when the third actuating mechanism 27 is energised, to cause the rotational speed of the input shaft 11 of the gearbox to decrease relative to the rotational speed of the output shaft 12. The means 37 may comprise a valve through which oil at a high pressure is supplied to the gearbox 10. If the final magnitude in the first counter is greater than three and has passed through zero the gear ratio is less than the ratio of the rotational speeds of the input and output shafts of the gearbox. Hence, the proportion of the difference between these ratios in relation to the gear ratio is reduced to less than the predetermined maximum value by decreasing the rotational speed of the input shaft 11 of the gearbox.

The operation of the means according to the present invention is controlled in any convenient manner, and in the illustrated arrangement is controlled by a three-stage sequence counter 40. The sequence counter is caused to progress through its different stages in response to pulses from the first transducer 16. The sequence counter controls the means according to the present invention through the gating means between the first and second counters 19 and 20 and the actuating mechanisms 25, 26 and 27.

The gating means also may have any convenient arrangement, but in the illustrated form comprises a combination of logic gates arranged to operate in accordance with the positive logic convention. Consider initially that the sequence counter is in its reset stage 41. The output of the reset stage 41 is supplied to a NAND gate 42 and then to a NAND gate 43, and so prevents pulses from the first transducer 16 causing the sequence counter 40 to progress. However, in response to a gear being selected, one of the outputs I . . . VII of the gearbox control 10' enables a NAND gate 44, and the output of this gate 44 is supplied via an OR gate 45 to the NAND gate 42 and hence to NAND gate 43. Thus, the next pulse from the first transducer 16 causes the sequence counter 40 to progress to its next stage 46. The output of the stage 46 is supplied to the first and second stores 13 and 14, and permits the appropriate magnitudes to be set in the first and second counters under the control of a signal supplied from the gearbox control 10' to the stores via the decoding means. The output of the stage 46 is also directly connected to the NAND gate 43 so that the next pulse from the first transducer 16 causes the sequence counter 40 to progress again to a stage 47. The output of the stage 47 is supplied to a NAND gate 48 and hence to the NAND gate 43, and causes the NAND gate 43 to prevent any further progression of the sequence counter until the NAND gate 48 is disenabled. In addition the output from this stage 47 of the sequence counter is supplied via NOR gates 49 and 50 to NAND gates 51 and 52 comprising, respectively, part of the interface unit 21 and 22 between, respectively, the first transducer 16 and the first counter 19, and the second transducer 17 and the second counter 20. Hence, pulses from the transducers are supplied to the associated counters, and the magnitudes set in the counters are counted down.

When the magnitude in the second counter 20 is zero, detected by an OR gate 53 determining that all the outputs of the second counter are zero, the OR gate 53 produces a signal to re-enable the NAND gate 51 and 52 via the NOR gates 49 and 50, and to prevent any more pulses being supplied by the transducers to the counters. This signal also is supplied to an OR gate 54 connected to the last six outputs of the first counter 19. If the last six outputs of the first counter are all zero, indicating that the magnitude in the first counter is between zero and three inclusively a signal is obtained on the output of the OR gate 54 in response to the signal from the OR gate 53.

A NAND gate 55 is connected to all the eight outputs of the reversible first counter 19, and a signal is produced on the output of this NAND gate when the magnitude in the first counter reaches zero. The NAND gate 55 is connected to a latch comprising a NAND gate 56 cross-connected with a further NAND gate 57. Hence, when the magnitude in the reversible first counter reaches zero the NAND gate 55 produces an output signal and the latch 56, 57 is set. If the latch 56, 57 is set an output signal is supplied by a NAND gate 56 to a NAND gate 58. If the latch 56, 57 is not set, indicating that the magnitude in the reversible first counter has not reached zero, an output signal is supplied by NAND gate 57 to a NAND gate 59. NAND gates 58 and 59 are both also connected both to the output of the OR gate 53 and to the output of the OR gate 54. Thus, when signals are produced indicating that the magnitude in the second counter is zero, the magnitude in the first counter has not reached zero, but is greater than three, a signal is produced at the output of NAND gate 59. However, if signals are produced indicating that, the magnitude in the second counter is zero, the magnitude in the first counter has reached zero, and is greater than three, a signal is produced at the output of NAND gate 58.

The output of OR gate 54, NAND gate 58 and NAND gate 59 are each connected to three latches, each latch comprising a pair of cross-connected NAND gates, 60 and 61, or 62 and 63, or 64, and 65. NAND gates 60, 62 and 64 of these latches are connected to the OR gate 54, and NAND gates 61, 63, and 65 of these latches are connected to both the NAND gates 58 and 59. A signal on the output A of the gating means is obtained from NAND gate 60 when latch 60, 61 is set by an output signal from OR gate 54, and latches 62, 63 and 64, 65 are either not set, or are reset by output signals from NAND gates 58 and 59. A signal on the output B of the gating means is obtained from NAND gate 62 when latch 62, 63 is set by an output signal from NAND gate 59, and latches 60, 61 and 64, 65 are either not set or are reset by output signals from OR gate 54 and NAND gate 58. A signal on the output C of the gating means is obtained from NAND gate 64 when latch 64, 65 is set by an output signal from NAND gate 58, and latches 60, 61 and 62, 63 are not set by output signals from OR gate 54 and NAND gate 59. As stated above, a signal on the output A causes the selected gear to be engaged. Simultaneously NAND gate 44 and gearbox control 10' are reset by the signal on the output A. A signal on the output B causes the rotational speed of the input shaft 11 of the gearbox to be increased relative to that of the output shaft. A signal on the output C causes the rotational speed of the input shaft 11 of the gearbox to be decreased relative to that of the output shaft.

A signal supplied to either output B or C of the gating means is also supplied to the OR gate 45, and hence to NAND gates 42 and 43, and the sequence counter is caused to progress from its reset stage 41 in response to the next pulse from the first transducer. The operation of the means according to the present invention is caused to be repeated until a signal is supplied at the output A of the gating means, and the selected gear is engaged. The latch 56, 57 is reset by a signal from the reset stage 41 of the sequence counter supplied via a NOT gate 66. A signal supplied at any one of the outputs A, or B, or C of the gating means is supplied via an OR gate 67 to cause the magnitudes stores in the first or second counters to be reset at zero.

The NOR gates 49 and 50 referred to above each comprise an OR gate and a NOT gate connected in series. Any AND gate comprises the appropriate number of NAND gate, one for each input, connected in series.

All the electrical components of at least the number generating means 13, 14 the first and second counters 19, 20, the gating means, and the sequence counter control 40 may be provided within an integrated circuit semiconductor device, which device may be manufactured by a known method. The parts of the number generating means 13, 14 comprise semiconductor stores of a known construction, the counter 19, 20 and the sequence counter 40 each have a known construction and the gating means 24 comprises an arrangement of logic gates of a known construction. As discrete components these parts are included in the FERRANTI SEMICONDUCTORS TECHNICAL HANDBOOK of Ferranti Limited, England.

The magnitudes initially set in the counters by the number generating means may vary according to the prevailing conditions within the means. Thus, account may be taken of the gear which is already engaged and/or the rotational speed of either the input or output shaft of the gearbox. If the prevailing conditions are not taken into account the magnitudes initially set in the counters upon the selection of a particular gear are the same each time the gear is selected, different initial combinations of magnitudes being set when different gears are selected. However, if the prevailing conditions are taken into account, the magnitudes initially set in the counters upon the selection of a particular gear may be one of several different possible combinations of magnitudes. Thus, the stores 13 and 14 require to be larger, and all the different possible magnitudes are required to be written into the stores. The appropriate locations of the stores are addressed in response both to a signal from the gearbox and to the detection of the prevailing conditions.

The pulses provided by the two transducers of the transducer means may not have frequencies in the same proportion to the rotational speeds of the input and output shafts of the gearbox which they represent. Hence, the magnitudes set initially in the counters take this difference into account.

The arrangement of the means according to the present invention may take many different forms commensurate with the detection of whether or not the proportion of any difference between the desired gear ratio and the ratio of the rotational speeds of the input and output shafts of the gearbox in relation to the desired gear ratio is less than the predetermined maximum value i.e. for the smooth engagement of the selected gear. However, in means according to the present invention the comparator means comprises a first counter and a second counter, upon the selection of a gear, initial magnitudes are set in the counters, the ratio of the magnitudes being representative of the desired gear ratio, and the magnitudes are then changed in response to signals from transducer means and representative of the rotational speed of both the input shaft and the output shaft of the gearbox, the comparator means finally providing an output representative of the proportion required to be detected. Hence, the transducer means may provide other forms of signals than pulses of frequencies proportional to the rotational speeds of the shafts. The magnitudes stored in the counters may not be counted down, but may be counted up in response to signals from the transducer means. The counting operation in response to the signals from the transducer means may not be stopped when the magnitude stored in one counter is zero, but may be stopped when the stored magnitude in one counter is some other particular value. Further, upon the selection of any gear the same magnitude always may be stored in one counter, but the magnitude stored in the other counter differs according to the gear selected, and possibly also the prevailing conditions, only one store being required within the number generating means.

The means according to the present invention is described above in a combination with means whereby the ratio of the rotational speeds of the input and output shafts of the gearbox is capable of being changed in the appropriate manner in response to the detection that the proportion of any difference between the desired gear ratio and the ratio of rotational speeds in relation to the desired gear ratio is greater than the predetermined maximum value, in addition to the prevention of the commencement of the engagement of the selected gear. This associated means may be omitted in whole or in part. If the means is arranged to change the ratios of the rotational speeds it may be arranged to change the rotational speed of the output shaft in relation to the input shaft instead of the alternative arrangement described above. When the rotational speed of the input shaft is changed, the associated means for causing the rotational speed of the input shaft of the gearbox to be decreased may not be provided, the friction inherently present between the relatively-movable mechanical parts associated with the system being relied upon to cause the reduction in the rotational speed when required.

The means according to the present invention described above has gating means. However, gating means generally of this form may be omitted and the comparator means comprising the first and second counters may be arranged to provide an output representative in any desired way of the proportion of any difference between the desired gear ratio and the ratio of the rotational speeds of the input and output shafts of the gearbox in relation to the desired gear ratio. The arrangement may be such that the output of the comparator means is supplied directly to associated means controlling the commencement of the engagement of the selected gear, but in such a case it may not be possible to provide within the associated means an arrangement whereby the ratio of the rotational speeds of the input and output shafts of the gearbox is capable of being changed in the appropriate manner in response to the detection that the proportion is greater than the predetermined maximum value.

The comparator means comprising the first and second counters may be such that the output of the second counter, or the outputs of both counters instead of only the output of the first counter, represent the proportion.

The predetermined maximum value for the proportion of the difference between the desired gear ratio and the ratio of the rotational speeds of the input and output shafts of the gearbox in relation to the desired gear ratio, and comprising an inherent design feature of the gearbox, may be different for the different gears of the gearbox, and consequently the number generating means is arranged appropriately.

What I claim is:

1. Means for determining the relative speeds of the input and output shafts of a gearbox comprising means having a first transducer and a second transducer arranged to produce signals representative of the rotational speeds of both the input shaft and the output shaft of the gearbox, compactor means including a first counter connected to the first transducer and a second counter connected to the second transducer, number generating means for setting magnitudes in the counters, the ratio of the magnitude set in the first counter to the magnitude set in the second counter being representative of the desired gear ratio for the gearbox, the magnitudes stores in the counters then being changed by signals from the transducer means, the arrangement being such that the comparator means provides an output representative of the proportion of any difference between the desired gear ratio and the ratio of the rotational speeds of the input and output shafts of the gearbox in relation to the desired gear ratio.

2. Means as claimed in claim 1 including gating means connected to the comparator means and producing an output signal in response to the detection that the proportion is less than a predetermined maximum value.

3. Means as claimed in claim 2 in which another output signal of the gating means is produced in response to the detection that the desired gear ratio is greater than the ratio of the rotational speeds of the input and output shafts of the gearbox, and that the proportion is greater than the predetermined maximum value.

4. Means as claimed in claim 2 in which another signal of the gating means is produced in response to the detection that the desired gear ratio is less than the ratio of the rotational speeds of the input and output shafts of the gearbox, and that the proportion is greater than the predetermined maximum value.

5. Means as claimed in claim 1 in which an indication that the proportion is less than a predetermined maximum value is provided by the final magnitude stored in one of the counters of the comparator means being within a predetermined range of values.

6. Means as claimed in claim 1 in which each transducer produces pulses at a frequency representative of the rotational speed of the associated shaft of the gearbox, the magnitude stored in the associated counter being changed at a rate proportional to the pulse frequency from the transducer.

7. Means as claimed in claim 6 in which the magnitude stored in each counter is counted down at a rate proportional to the pulse frequency from the associated transducer.

8. Means as claimed in claim 1 in which the changing of the magnitudes stored in both counters is stopped when the magnitude stored in one counter is a particular value.

9. Means as claimed in claim 1 in which the number generating means comprises at least one store, different magnitudes being written into each store, the appropriate location of the store being addressed in response to at least a signal from the gearbox upon a gear being selected, and the corresponding magnitude being set in the associated counter.

10. Means as claimed in claim 1 in which the magnitude set in at least one counter is in response to signals from the gearbox indicating both the gear selected and the gear already engaged.

11. Means as claimed in claim 1 in which the magnitude set in at least one counter is in response both to a signal from the gearbox indicating the gear selected and a signal from the transducer means indicating the rotational speed of one shaft of the gearbox.

\* \* \* \* \*